US012243214B2

(12) United States Patent
Tang et al.

(10) Patent No.: US 12,243,214 B2
(45) Date of Patent: Mar. 4, 2025

(54) FAILURE DETECTION AND FAILURE RECOVERY FOR AI DEPALLETIZING

(71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 404 days.

(21) Appl. No.: 17/649,811

(22) Filed: Feb. 3, 2022

(65) Prior Publication Data
US 2023/0245293 A1    Aug. 3, 2023

(51) Int. Cl.
| G06T 7/00 | (2017.01) |
| B25J 9/16 | (2006.01) |
| B25J 13/08 | (2006.01) |
| G06T 7/11 | (2017.01) |

(52) U.S. Cl.
CPC .............. *G06T 7/0004* (2013.01); *B25J 13/08* (2013.01); *G06T 7/11* (2017.01); *B25J 9/1697* (2013.01); *G06T 2200/04* (2013.01); *G06T 2200/24* (2013.01); *G06T 2207/10024* (2013.01); *G06T 2207/20081* (2013.01); *G06T 2207/20084* (2013.01)

(58) Field of Classification Search
CPC .................. G06T 7/11; G06T 2200/24; G06T 2207/20081; G06T 2207/20084; G06T 7/0004; G06T 2200/04; G06V 10/82; G06V 10/26; G06V 2201/06; G06V 20/64; G06N 3/08
See application file for complete search history.

(56) References Cited

U.S. PATENT DOCUMENTS

| 2017/0021502 A1* | 1/2017 | Nusser .................. B25J 9/1687 |
| 2019/0091869 A1* | 3/2019 | Yamazaki ................ B25J 15/08 |
| 2019/0347547 A1* | 11/2019 | Ebstyne ................... G06N 3/08 |
| 2020/0143171 A1* | 5/2020 | Lee ......................... G06V 20/49 |
| 2020/0156254 A1* | 5/2020 | Li ........................ G06V 30/248 |
| 2020/0219043 A1* | 7/2020 | Talbot ................. G06F 16/5854 |
| 2020/0364871 A1* | 11/2020 | Bradski ................. G06T 11/203 |

(Continued)

FOREIGN PATENT DOCUMENTS

CN           107945192 A  *  4/2018    .............. G06T 7/12

*Primary Examiner* — Michael Robert Cammarata
(74) *Attorney, Agent, or Firm* — John A. Miller; Shumaker, Loop & Kendrick, LLP

(57) ABSTRACT

A method for identifying inaccurately depicted boxes in an image, such as miss detected boxes and partially detected boxes. The method obtains a 2D RGB image of the boxes and a 2D depth map image of the boxes using a 3D camera, where pixels in the depth map image are assigned a value identifying the distance from the camera to the boxes. The method generates a segmentation image of the boxes using a neural network by performing an image segmentation process that extracts features from the RGB image and segments the boxes by assigning a label to pixels in the RGB image so that each box in the segmentation image has the same label and different boxes in the segmentation image have different labels. The method analyzes the segmentation image to determine if the image segmentation process has failed to accurately segment the boxes in the segmentation image.

13 Claims, 3 Drawing Sheets

(56) References Cited

U.S. PATENT DOCUMENTS

| | | | | |
|---|---|---|---|---|
| 2020/0364873 A1* | 11/2020 | Bradski | ............... | G06T 7/12 |
| 2020/0364913 A1* | 11/2020 | Bradski | ............... | G06T 7/11 |
| 2021/0004965 A1* | 1/2021 | Tung | ............... | G06V 10/28 |
| 2021/0133666 A1* | 5/2021 | Eckman | ............... | G06T 7/62 |
| 2021/0237269 A1 | 8/2021 | Hvass et al. | | |
| 2022/0072712 A1* | 3/2022 | Tang | ............... | B25J 9/1697 |
| 2022/0261593 A1* | 8/2022 | Yu | ............... | G06N 3/088 |
| 2022/0292306 A1* | 9/2022 | Radhakrishnan | ...... | G06V 10/82 |
| 2022/0379475 A1* | 12/2022 | Tang | ............... | G06T 7/73 |
| 2023/0054588 A1* | 2/2023 | Honarvar | ............... | G06T 7/174 |
| 2023/0169675 A1* | 6/2023 | Tang | ............... | G06T 7/187 |
| | | | | 382/103 |
| 2023/0186477 A1* | 6/2023 | Gilbert | ............... | G06T 7/0012 |
| | | | | 382/128 |

\* cited by examiner

FAILURE DETECTION AND FAILURE RECOVERY FOR AI DEPALLETIZING

BACKGROUND

Field

This disclosure relates generally to a system and method for detecting and correcting failures in processed images and, more particularly, to a system and method for detecting and correcting failures in segmentation images generated by a neural network, where the segmentation images have particular application for identifying boxes to be picked up by a robot from a stack of boxes.

Discussion of the Related Art

Robots perform a multitude of commercial tasks including pick and place operations, where the robot picks up and moves objects from one location to another location. For example, the robot may pick up boxes off of a pallet and place the boxes on a conveyor belt, where the robot likely employs an end-effector with suction cups to hold the boxes. In order for the robot to effectively pick up a box, the robot needs to know the width, length and height of the box it is picking up, which is input into the robot controller prior to the pick and place operation. However, often times the boxes on the same pallet have different sizes, which makes it inefficient to input the size of the boxes into the robot during the pick and place operation. The boxes can also be placed side-by-side at the same height, where it is challenging to distinguish whether they are separate boxes or a single large box.

U.S. patent application Ser. No. 17/015,817, filed Sep. 9, 2020, titled, Mix-Size Depalletizing, assigned to the assignee of this application and herein incorporated by reference, discloses a system and method for identifying a box to be picked up by a robot from a stack of boxes. The method includes obtaining a 2D red-green-blue (RGB) color image of the boxes and a 2D depth map image of the boxes using a 3D camera, where pixels in the depth map image are assigned a value identifying the distance from the camera to the boxes. The method employs a modified deep learning mask R-CNN (convolutional neural network) that generates a segmentation image of the boxes by performing an image segmentation process that extracts features from the RGB image, combines the extracted features in the images and assigns a label to the pixels in a features image so that the pixels for each box in the segmentation image have the same label and the pixels for different boxes in the segmentation image have different labels. The method then identifies a location for picking up the box using the segmentation image.

The method disclosed in the '817 application employs a deep learning neural network for an image filtering step, a region proposal step and a binary segmentation step. Deep learning is a particular type of machine learning that provides greater learning performance by representing a certain real-world environment as a hierarchy of increasing complex concepts. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers.

Neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Deep learning neural networks are often employed to provide image feature extraction and transformation for the visual detection and classification of objects in an image, where a video or stream of images can be analyzed by the network to identify and classify objects and learn through the process to better recognize the objects. The number of layers and the number of nodes in the layers in a neural network determine the network's complexity, computation time and performance accuracy. The complexity of a neural network can be reduced by reducing the number of layers in the network, the number of nodes in the layers or both. However, reducing the complexity of the neural network reduces its accuracy for learning, where it has been shown that reducing the number of nodes in the layers has accuracy benefits over reducing the number of layers in the network.

These types of deep learning neural networks require significant data processing and are data driven, i.e., a lot of data is required for training the neural network. For example, for a robot picking up boxes, the neural network would be trained to identify certain sizes and shapes of boxes from a training dataset of boxes, where the more boxes that are used for training the more data is required. However, an end user of the robot may require different sized and shaped boxes to be picked up that were not part of the training dataset. Further, different textures on a single box and labelling on the box may create a failed detection. Thus, the neural network may not have the necessary segmentation capability to identify those boxes. This could result in different types of failures, such as a missed detection failure and a partial segmentation failure. A missed detection occurs when a smaller box is on top of a larger box and the smaller box is not detected by the segmentation process, which may cause the robot to crash into the top box, where the smaller box was not part of the training dataset. A partial segmentation occurs when a label or other feature on a box causes the neural network to segment two boxes when there is only one box, which may cause the robot to pick up the box off-center where the box may be tilted creating obvious problems.

A solution to the above described problem could be to provide more boxes or specific types of boxes for a certain end user that are used to train the neural network. However, the segmentation model used in the neural network is imperfect, which results in a reluctance to use the neural network because damage to the robot and other things could occur. Without using the imperfect neural network failure samples aren't obtained that could be used to improve the model, i.e., data would not be provided to further train and fine tune the neural network.

SUMMARY

The following discussion discloses and describes a system and method for identifying inaccurately depicted, for example, boxes in an image of a group of boxes, such as missed detection of boxes and partial detection of boxes. The method obtains a 2D red-green-blue (RGB) color image of the boxes and a 2D depth map image of the boxes using a 3D camera, where pixels in the depth map image are assigned a value identifying the distance from the camera to the boxes. The method generates, for example, a segmentation image of the boxes using a neural network by performing an image segmentation process that extracts features from the RGB image and segments the boxes by assigning a label to pixels in the RGB image so that the pixels for each box in the segmentation image have the same label and the pixels for different boxes in the segmentation image have different labels. The method analyzes the segmentation image to determine if the image segmentation process has failed to accurately segment the boxes in the segmentation image.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for detecting and correcting failures in processed images is merely exemplary in nature, and is in no way intended to limit the invention or its applications or uses. For example, the system and method have application for identifying boxes to be picked up by a robot. However, the system and method may have other applications.

Figure 1:
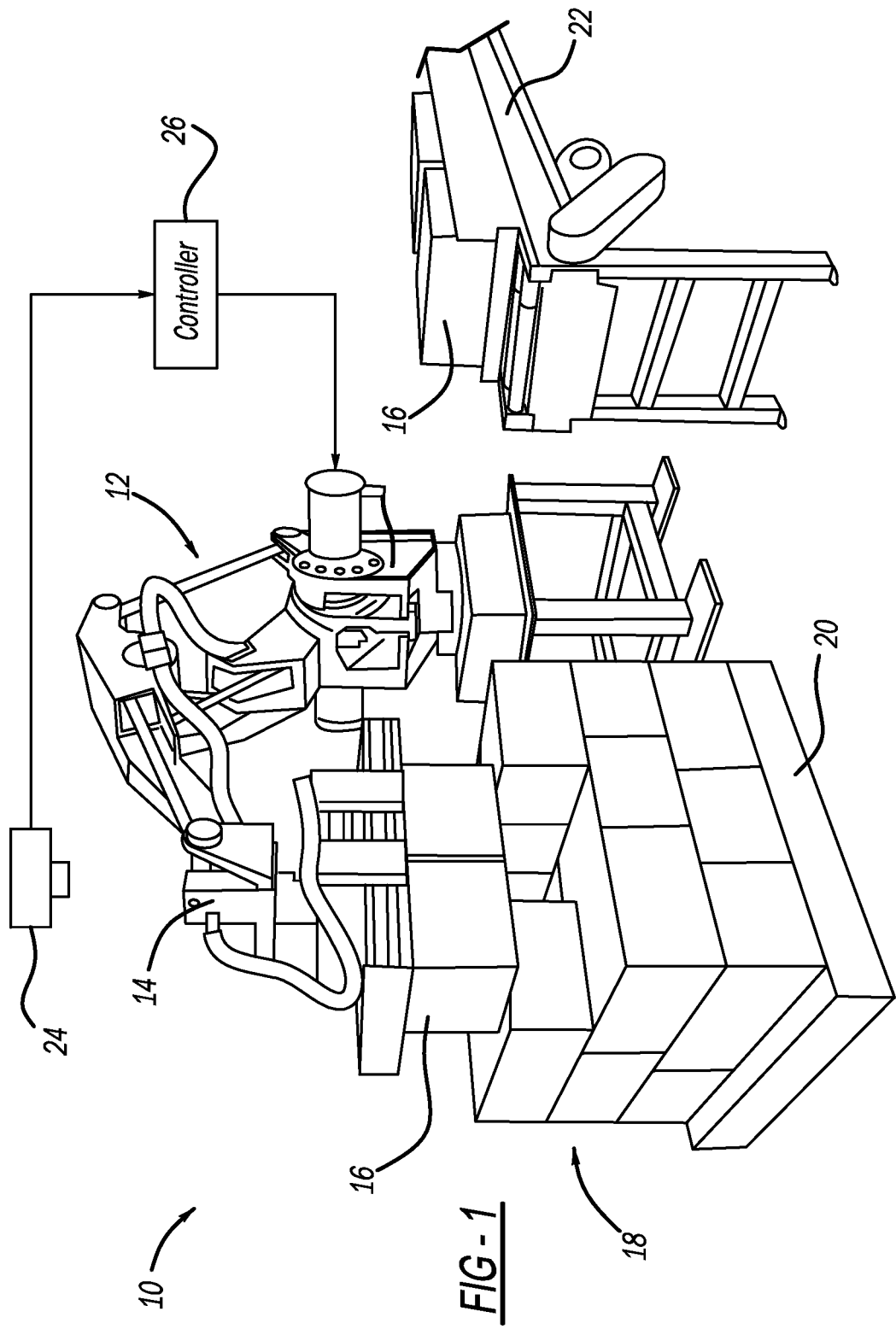
FIG. 1 is an illustration of a robot system including a robot picking up boxes off of a pallet and placing them on a conveyor belt.

FIG. 1 is an illustration of a robot system 10 including a robot 12 having an end-effector 14 that is configured for picking up boxes 16 from a stack 18 of the boxes 16 positioned on a pallet 20 and placing them on a conveyor belt 22. The system 10 is intended to represent any type of robot system that can benefit from the discussion herein, where the robot 12 can be any robot suitable for that purpose. A 3D camera 24 is positioned to take top down 2D RBG and depth map images of the stack 18 of the boxes 16 and provide them to a robot controller 26 that controls the movement of the robot 12. The boxes 16 may have different orientations on the pallet 20, may be stacked in multiple layers on the pallet 20 and may have different sizes.

Figure 2:
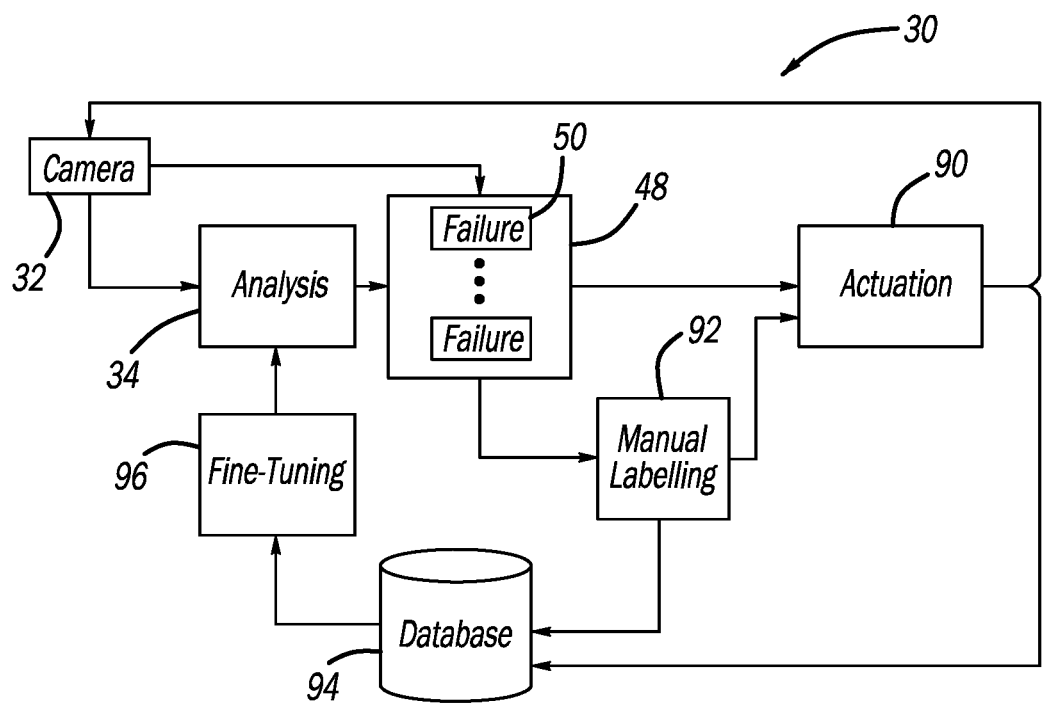
FIG. 2 is a schematic block diagram of a system for detecting and correcting failures in processed images that are used to identify objects to be picked up by a robot.

FIG. 2 is a schematic block diagram of a system 30 for detecting and correcting failures in processed images that are used to identify objects, such as the boxes 16, to be picked up by the robot 12. The system 30 includes a 3D camera 32, representing the camera 24, that obtains top down RGB images and 2D depth map images of the objects. The RGB and depth map images are provided to an analysis module 34 that performs processing on the RGB and 2D depth map images in any suitable manner to provide the processed images to identify the objects in a form that allows the objects to be picked up by the robot 12. In one non-limiting example, the analysis module 34 performs the segmentation process described in the '817 application that employs a modified deep learning mask R-CNN that generates segmentation images of the boxes 16 by performing an image segmentation process that extracts features from the RGB image and the depth map image, combines the extracted features in the images and assigns a label, such as color, to the pixels in a features image so that the pixels for each box in the segmentation image have the same label and the pixels for different boxes in the segmentation image have different labels.

Figure 3:
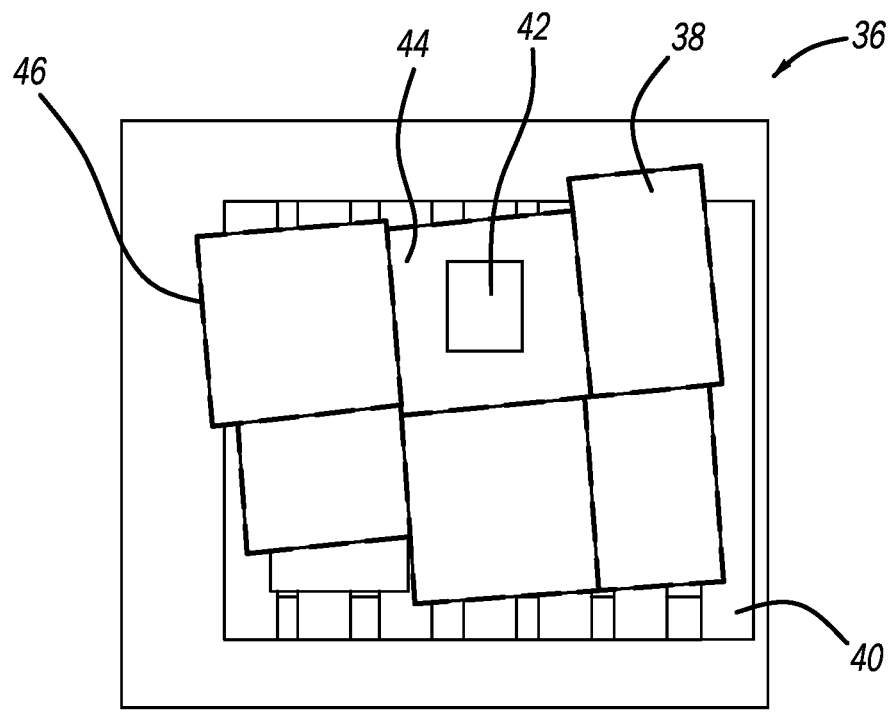
FIG. 3 shows a top down RGB segmentation image of a group of randomly arranged boxes on a pallet showing a missed detection failure.

FIG. 3 is a top down RGB segmentation image 36 of a group of randomly arranged boxes 38 on a pallet 40 that is output from the analysis module 34, where one of the boxes 38 is a smaller box 42 resting on a larger box 44. The analysis module 34 identifies the segmented position and orientation of the boxes 38 in the segmentation image 36 and selects a candidate box as the next box to be picked up by the robot 12, for example, the highest box. FIG. 3 shows a segmentation bounding box 46 around the boxes 38 at a top level in the stack of the boxes 38 in the segmentation image 36, where each bounding box 46 is defined around the pixels having the same label. As is apparent, there is not a bounding box 46 around the smaller box 42, thus indicating a missed detection.

The analysis module 34 sends the processed images to a failure detection module 48 to identify failures in the images. For example, for the specific embodiment discussed above, the module 34 sends the position and orientation information for the boxes 38 having a bounding box 46 in the image 36 to the failure detection module 48 that determines if the position and orientation of the boxes 38 is correct or incorrect, where the failure detection module 48 also receives the RGB image and the depth map image from the camera 32. The failure detection module 48 includes a number of failure detection sub-modules 50 each running in parallel and each operating to detect one of the failures discussed herein.

One of the failure detection sub-modules 50 may identify missed detections. The depth map image allows the failure detection module 48 to determine the distance that each pixel in the image 36 is from the camera 32. The distance of each pixel within a segmentation bounding box 46 in the image 36 should be about the same as every other pixel in that segmentation bounding box 46. By separately looking at the distance of each group of pixels in each bounding box 46 it can be determined whether there is a missed box detection.

Figure 4:
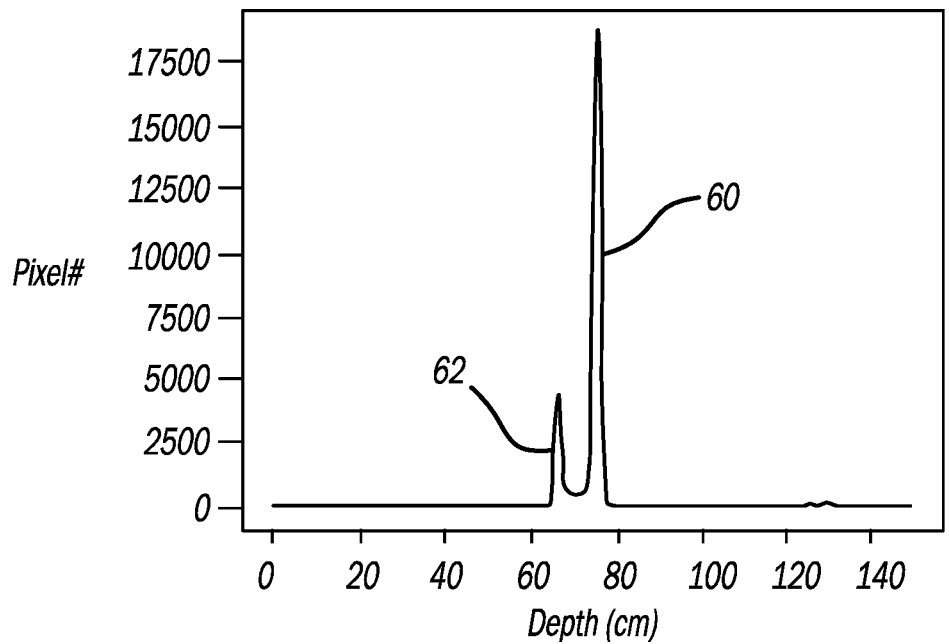
FIG. 4 is a graph with distance on the horizontal axis and number of pixels on the vertical axis for a bounding box formed around a larger box with a smaller box on top of it.

FIG. 4 is a graph with distance on the horizontal axis and number of pixels on the vertical axis for the bounding box 46 around the larger box 44, where such a graph would be generated for each bounding box 46. The taller peak 60 of pixel numbers that are farther away from the camera 32 identifies the distance of most of the pixels within the bounding box 46 around the larger box 44 and thus provides the distance of the larger box 44 from the camera 32. The shorter peak 62 of pixel numbers that are closer to the camera 32 identifies the distance of the pixels for the smaller box 42 that is closer to the camera 32. Therefore, a missed detected box is identified. If the graph only had one peak, then only one of the boxes 38 would be in that bounding box 46. It is noted that a threshold is used for identifying a second peak so that a small peak that wouldn't be a missed detected box 38 is not identified as a missed detection.

Figure 5:
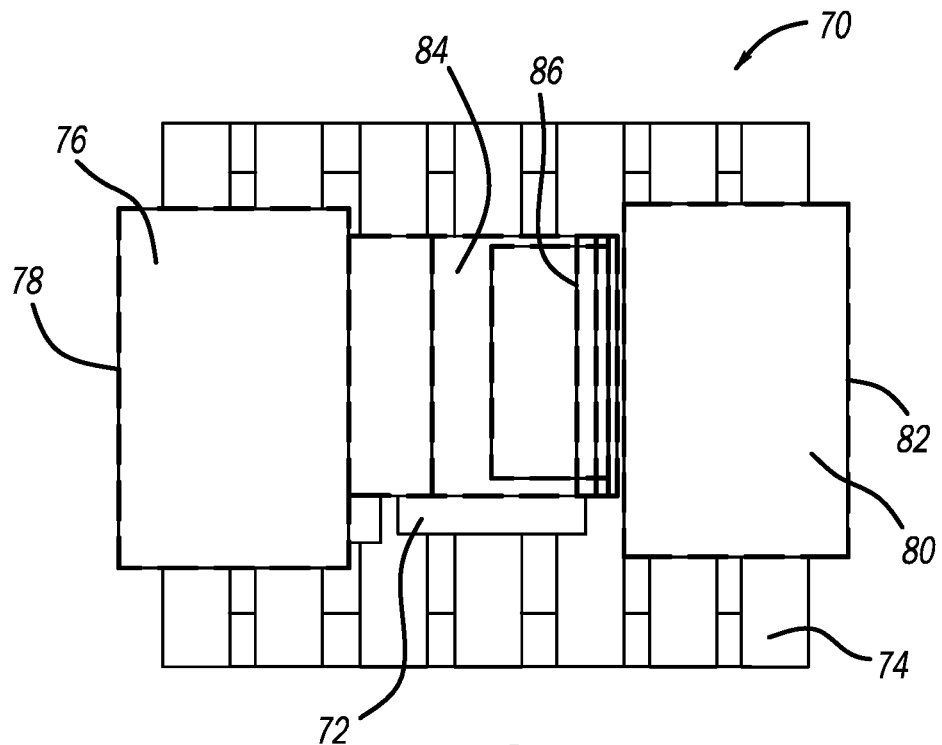
FIG. 5 shows a top down RGB segmentation image of a group of randomly arranged boxes on a pallet showing a partial segmentation failure.

One of the failure detection sub-modules 50 in the failure detection module 48 may identify partial segmentations where there are more than one separated bounding box 46 for a single box 38. Generally, each of the bounding boxes 46 output from the analysis module 34 has been determined by the analysis module 34 to have a predetermined high probability of bounding a box 38 in the image 36, for example, 95% probability. However, the analysis module 34 identifies many bounding boxes 46 that have a lower probability of bounding a box 38, which are discarded in the segmentation process disclosed in the '817 application. For the system 30, the analysis module 34 retains some or all of the lower probability bounding boxes 46 and outputs them to the failure detection module 48. This is illustrated by FIG. 5 showing a top down RGB segmentation image 70 of a group of randomly arranged boxes 72 on a pallet 74 that is output from the analysis module 34. The image 70 includes, on a top layer, a left-side box 76 surrounded by a bounding box 78, a right-side box 80 surrounded by a bounding box 82 and a middle box 84 over which several bounding boxes 86 are shown. The bounding boxes 78 and 82 are actually multiple bounding boxes that overlap each other giving a high probability that they define the border of the boxes 76 and 80, respectively. The spaced apart bounding boxes 86 thus provide an indication that the boundary of the box 84 has not been identified with high confidence, and could possibly be segmented as multiple boxes in the segmentation image in the segmentation process disclosed in the '817 application. Therefore, by looking at the intersection ratio, i.e., how well the bounding boxes for a particular box overlap, a possible partially segmented box can be identified.

The failure detection sub-modules 50 in the failure detection module 48 can also detect other failures. One of those other failures can be detecting an empty pallet. By obtaining a depth map image of an empty pallet before the boxes are placed on it, that image can be compared with real time depth map images in one of the sub-modules 50 and if enough pixels above a threshold indicate the same distance, the module 48 knows that all of the boxes have been picked up.

Another one of the other failures can be detecting whether a segmented box in the segmentation image has been identified that is larger or smaller than a known maximum or minimum sized box, which would be a failed box detection in the segmentation image. One of the failure detection sub-modules 50 could look at the size of each bounding box in the segmentation image, and if a bounding box is larger than the maximum sized box or smaller than the minimum sized box, then an alarm can be sent indicating a failure.

Returning to FIG. 2, if none of the failure detection sub-modules 50 detects a failure as discussed above, then the position and orientation of the next box selected to be picked up is sent to an actuation module 90 that operates the robot 12 to pick up that box and place it on the conveyor 22. The system 30 then causes the camera 32 to take the next top down RGB image and depth map image of the stack 18 to pick up the next box 16 off of the pallet 20. If any or some of the failure detection sub-modules 50 detect a certain failure, then no signal is sent to the actuation module 90 and the robot 12 stops. One or more alarm signals are then sent to a manual labelling module 92, which is a user interface computer and screen being monitored by a human user. The human user will look at the processed images generated by the analysis module 34 on the screen and visually identify the problem that is causing the failure. For example, the human user may use an algorithm operating in the computer to draw or redraw proper bounding boxes around the box or boxes that are causing the failure, and then send that adjusted RGB segmentation image to the actuation module 90, which causes the robot 12 to pick up the manually labeled box in the image.

The processed images including the failure from the manual labelling box 92 and the correct or corrected images from the actuation module 90 are sent to a database 94 to be stored so that the system 30 includes the failed images, the images that corrected the failed images and the properly processed images from the failure detection module 48. Then, at some selected time these images are sent to a fine-tuning module 96 that use the corrected images, good images and failed images, to revise the processing in the analysis module 34, such as further train the neural network nodes in the analysis module 34. Therefore, the analysis module 34 will be further trained to pick up boxes at a user's facility that may not have been used to train the neural network nodes using the original dataset and will be trained to prevent generating failed images the next time the configuration of boxes that previously generated the failed image occurs.

As will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method comprising:
    obtaining 2D red-green-blue (RGB) color images of the objects using a 3D camera;
    obtaining 2D depth map images of the objects using the 3D camera, where pixels in the depth map images are assigned a value identifying the distance from the camera to the objects;
    processing the RGB images and the depth map images to generate processed images of the objects;
    analyzing the processed images to determine if the objects are correctly depicted in the processed images, wherein analyzing the processed images includes identifying an empty pallet by obtaining a depth map image of an empty pallet before the boxes are placed on it, comparing the empty pallet depth map image to the depth map image from the 3D camera and when enough pixels above a threshold indicate the same distance, identifying the empty pallet;
    sending the processed images to a user interface if when analyzing the processed images determines that processing the RGB images and the depth map images has failed to correctly depict the objects in the processed images, said user interface allowing a user to correct the processed images;

storing correct processed images, failed processed images and corrected processed images;

training the processing of the RGB images and the depth map images using the stored correct processed images, failed processed images and corrected processed images; and applying trained processed images to new RGB and depth map images.

2. The method according to claim 1 wherein the objects are boxes and wherein processing the RGB images and the depth map images includes generating a segmentation image of the boxes using a neural network by performing an image segmentation process that extracts features from the RGB images and segments the boxes by assigning a label to pixels in the RGB images so that each box in the segmentation image has the same label and different boxes in the segmentation image have different labels.

3. The method according to claim 2 wherein analyzing the processed images includes identifying a missed detected box by analyzing the labels of the boxes in the segmentation image to determine if a box in the segmentation image has not been identified by a different label.

4. The method according to claim 3 wherein generating a segmentation image includes providing a bounding box around each labelled box in the segmentation image, and wherein the box in the segmentation image that has not been identified by a different label does not have a bounding box.

5. The method according to claim 4 wherein analyzing the labels of the boxes in the segmentation image includes counting the pixels within each bounding box from the depth map images that have the same distance value and determining that there is more than one box within a bounding box if there is more than one pixel count above a predetermined threshold.

6. The method according to claim 2 wherein analyzing the processed images includes identifying a partially segmented box.

7. The method according to claim 6 wherein generating a segmentation image includes providing a plurality of bounding boxes around each box in the segmentation image with varying degrees of confidence that each bounding box identifies a box in the segmentation image, and wherein analyzing the segmentation image includes observing an overlap intersection ratio of the plurality of bounding boxes around each box in the segmentation image where a predetermined low intersection ratio indicates a partially segmented box in the image.

8. The method according to claim 2 wherein generating a segmentation image includes providing a bounding box around each box in the segmentation image, and wherein analyzing the segmentation image includes identifying whether a segmented box in the segmentation image is larger or smaller than a predetermined maximum or minimum sized box by looking at the size of each boundary box in the segmentation image to determine if a boundary box is larger than the maximum sized box or smaller than the minimum sized box.

9. A robot system comprising:
a 3D camera that provides a 2D red-green-blue (RGB) color image and a 2D depth map image of objects;
means for processing the RGB image and the depth map image to generate a processed image of the objects;
means for analyzing the processed image to determine if the objects are correctly depicted in the processed image, wherein the objects are boxes and the means for analyzing the processed image employs a deep learning convolutional neural network that generates a segmentation image of the boxes by performing an image segmentation process that extracts features from the RGB image and the depth map image, combines the extracted features in the images and assigns a label to pixels in the segmentation image so that each box in the segmentation image has the same label and different boxes in the segmentation image have different labels, and wherein the means for analyzing the processed image identifies a missed detected box by analyzing the labels of the boxes in the segmentation image to determine if a box in the segmentation image has not been identified by a different label, wherein the deep learning convolutional neural network provides a bounding box around each labelled box in the segmentation image, and wherein the box in the segmentation image that has not been identified by a different label does not have a bounding box;

means for sending the processed image to a user interface if when analyzing the processed image determines that processing the RGB image and the depth map image has failed to correctly depict the objects in the processed image, said user interface allowing a user to correct the processed image;

means for storing correct processed images, failed processed images and corrected processed images;

means for training the processing of the RGB images and the depth map images using the stored correct processed images, failed processed images and corrected processed images; and means for applying trained processed images to new RGB and depth map images.

10. The system according to claim 9 wherein the means for analyzing the processed image identifies a partially segmented box, wherein the deep learning convolutional neural network provides a plurality of bounding boxes around each box in the segmentation image with varying degrees of confidence that each bounding box identifies a box in the segmentation image, and wherein the means for analyzing the processed image observes an overlap intersection ratio of the plurality of bounding boxes around each box in the segmentation image where a predetermined low intersection ratio indicates a partially segmented box in the image.

11. A method comprising:
obtaining 2D red-green-blue (RGB) color images of boxes using a 3D camera;
obtaining 2D depth map images of the boxes using the 3D camera, where pixels in the depth map images are assigned a value identifying the distance from the camera to the boxes;
processing the RGB images and the depth map images to generate processed images of the boxes, wherein processing the RGB images and the depth map images includes generating a segmentation image of the boxes using a neural network by performing an image segmentation process that extracts features from the RGB images and segments the boxes by assigning a label to pixels in the RGB images so that each box in the segmentation image has the same label and different boxes in the segmentation image have different labels;
analyzing the processed images to determine if the boxes are correctly depicted in the processed images, wherein analyzing the processed images includes identifying a missed detected box by analyzing the labels of the boxes in the segmentation image to determine if a box in the segmentation image has not been identified by a different label;

sending the processed images to a user interface when analyzing the processed images determines that processing the RGB images and the depth map images has failed to correctly depict the boxes in the processed images, said user interface allowing a user to correct the processed images;

storing correct processed images, failed processed images and corrected processed images;

training the processing of the RGB images and the depth map images using the stored correct processed images, failed processed images and corrected processed images; and applying trained processed images to new RGB and depth map images.

12. A method comprising:

obtaining 2D red-green-blue (RGB) color images of boxes using a 3D camera;

obtaining 2D depth map images of the boxes using the 3D camera, where pixels in the depth map images are assigned a value identifying the distance from the camera to the boxes;

processing the RGB images and the depth map images to generate processed images of the boxes, wherein processing the RGB images and the depth map images includes generating a segmentation image of the boxes using a neural network by performing an image segmentation process that extracts features from the RGB images and segments the boxes by assigning a label to pixels in the RGB images so that each box in the segmentation image has the same label and different boxes in the segmentation image have different labels, wherein generating a segmentation image includes providing a plurality of bounding boxes around each box in the segmentation image with varying degrees of confidence that each bounding box identifies a box in the segmentation image;

analyzing the processed images to determine if the boxes are correctly depicted in the processed images, wherein analyzing the segmentation image includes observing an overlap intersection ratio of the plurality of bounding boxes around each box in the segmentation image where a predetermined low intersection ratio indicates a partially segmented box in the image;

sending the processed images to a user interface when analyzing the processed images determines that processing the RGB images and the depth map images has failed to correctly depict the boxes in the processed images, said user interface allowing a user to correct the processed images;

storing correct processed images, failed processed images and corrected processed images;

training the processing of the RGB images and the depth map images using the stored correct processed images, failed processed images and corrected processed images; and applying trained processed images to new RGB and depth map images.

13. A method comprising:

obtaining 2D red-green-blue (RGB) color images of boxes using a 3D camera;

obtaining 2D depth map images of the boxes using the 3D camera, where pixels in the depth map images are assigned a value identifying the distance from the camera to the boxes;

processing the RGB images and the depth map images to generate processed images of the boxes, wherein processing the RGB images and the depth map images includes generating a segmentation image of the boxes using a neural network by performing an image segmentation process that extracts features from the RGB images and segments the boxes by assigning a label to pixels in the RGB images so that each box in the segmentation image has the same label and different boxes in the segmentation image have different labels, wherein generating a segmentation image includes providing a bounding box around each box in the segmentation image;

analyzing the processed images to determine if the boxes are correctly depicted in the processed images, wherein analyzing the segmentation image includes identifying whether a segmented box in the segmentation image is larger or smaller than a predetermined maximum or minimum sized box by looking at the size of each boundary box in the segmentation image to determine if a boundary box is larger than the maximum sized box or smaller than the minimum sized box;

sending the processed images to a user interface when analyzing the processed images determines that processing the RGB images and the depth map images has failed to correctly depict the boxes in the processed images, said user interface allowing a user to correct the processed images;

storing correct processed images, failed processed images and corrected processed images;

training the processing of the RGB images and the depth map images using the stored correct processed images, failed processed images and corrected processed images; and applying trained processed images to new RGB and depth map images.

* * * * *